(12) United States Patent
Epars et al.

(10) Patent No.: US 9,309,044 B2
(45) Date of Patent: Apr. 12, 2016

(54) CAPSULE WITH INTEGRATED ANTIMICROBIAL FILTER

(75) Inventors: Yann Epars, Penthalaz (CH); Matthew David Steven, Cavite (PH); Anne Roulin, Yverdon-les-bains (CH)

(73) Assignee: Nestec S.A., Vevey (CH)

( * ) Notice: Subject to any disclaimer, the term of this patent is extended or adjusted under 35 U.S.C. 154(b) by 582 days.

(21) Appl. No.: 12/864,432

(22) PCT Filed: Jan. 8, 2009

(86) PCT No.: PCT/EP2009/050154
§ 371 (c)(1),
(2), (4) Date: Jul. 23, 2010

(87) PCT Pub. No.: WO2009/092629
PCT Pub. Date: Jul. 30, 2009

(65) Prior Publication Data
US 2010/0297299 A1    Nov. 25, 2010

(30) Foreign Application Priority Data

Jan. 24, 2008   (EP) ..................... 08100900

(51) Int. Cl.
*B65D 85/804* (2006.01)
*A23L 1/29* (2006.01)
*A23L 2/39* (2006.01)

(52) U.S. Cl.
CPC .............. *B65D 85/8043* (2013.01); *A23L 1/296* (2013.01); *A23L 2/39* (2013.01)

(58) Field of Classification Search
CPC ............. B65D 85/8043; B65D 85/816; B65D 85/804; B65D 65/46; B65D 2581/3409; B65B 29/02; B65B 29/06; A47J 31/3623; A47J 31/369; A47J 31/3676; A47J 31/368; A47J 31/407
USPC .......... 426/77, 78, 79, 80, 112, 115, 394, 132, 426/133; 99/295, 323
See application file for complete search history.

(56) References Cited

U.S. PATENT DOCUMENTS

| | | | | |
|---|---|---|---|---|
| 3,937,134 A * | 2/1976 | Molenaar et al. | ............... | 99/295 |
| 4,136,202 A | 1/1979 | Favre | | |
| 4,441,996 A * | 4/1984 | Hurst | ............. | 210/241 |
| 4,463,880 A | 8/1984 | Kramer et al. | | |
| 4,999,109 A * | 3/1991 | Sabre | ............. | 210/244 |
| 5,028,328 A * | 7/1991 | Long | ............. | 210/477 |

(Continued)

FOREIGN PATENT DOCUMENTS

| | | | | |
|---|---|---|---|---|
| CN | 1612831 | 5/2005 | | |
| CN | WO 2007054479 A1 * | 5/2007 | ............ | A23F 5/24 |

(Continued)

OTHER PUBLICATIONS

International Search Report for International Application No. PCT/EP2009/050154 mailed on Apr. 23, 2009.

(Continued)

*Primary Examiner* — Viren Thakur
(74) *Attorney, Agent, or Firm* — K&L Gates LLP

(57) ABSTRACT

The invention proposes a capsule (9) for use in a beverage production device. The capsule (9) contains one or several ingredients (12) for producing a beverage or liquid comestible when a liquid (3) is fed into the capsule (9). The capsule is provided with an integrated antimicrobial filter (1).

12 Claims, 3 Drawing Sheets

(56) References Cited

U.S. PATENT DOCUMENTS

| | | | |
|---|---|---|---|
| 5,186,830 A * | 2/1993 | Rait | 210/232 |
| 5,242,702 A * | 9/1993 | Fond | 426/433 |
| 5,402,707 A | 4/1995 | Fond et al. | |
| 5,472,719 A | 12/1995 | Favre | |
| 5,496,573 A * | 3/1996 | Tsuji et al. | 426/84 |
| 5,656,316 A | 8/1997 | Fond et al. | |
| 5,681,468 A | 10/1997 | Sawan et al. | |
| 5,958,478 A * | 9/1999 | Lehrer | 426/77 |
| 6,103,116 A * | 8/2000 | Koslow et al. | 210/282 |
| 6,461,607 B1 * | 10/2002 | Farmer | A61K 31/496 424/93.45 |
| 6,869,627 B2 * | 3/2005 | Perkovic et al. | 426/77 |
| 7,604,826 B2 | 10/2009 | Denisart et al. | |
| 2002/0035928 A1 * | 3/2002 | Kataoka | 99/279 |
| 2002/0078831 A1 * | 6/2002 | Cai | 99/295 |
| 2004/0228955 A1 * | 11/2004 | Denisart et al. | 426/590 |
| 2005/0266122 A1 * | 12/2005 | Franceschi | B65D 81/3216 426/77 |
| 2007/0259073 A1 * | 11/2007 | Scarchilli et al. | 426/78 |
| 2007/0272084 A1 * | 11/2007 | Mandralis et al. | 99/275 |
| 2009/0126578 A1 * | 5/2009 | Amann et al. | 99/295 |
| 2010/0136178 A1 * | 6/2010 | Rapparini | 426/77 |

FOREIGN PATENT DOCUMENTS

| | | | |
|---|---|---|---|
| EP | 0507905 B1 | 10/1992 | |
| EP | 0512470 | 11/1992 | |
| EP | 1500358 | 1/2005 | |
| EP | 1574452 | 9/2005 | |
| EP | 1472156 B1 | 3/2006 | |
| EP | 1710173 | 10/2006 | |
| EP | 1792850 | 6/2007 | |
| JP | 2002066561 | 3/2002 | |
| JP | 2002263166 | 9/2002 | |
| JP | 2005008225 | 1/2005 | |
| JP | 2005137495 | 6/2005 | |
| JP | 2005160972 | 6/2005 | |
| JP | 2009510629 | 3/2009 | |
| WO | 2006021405 | 3/2006 | |
| WO | WO 2006021405 A2 * | 3/2006 | B65D 85/804 |
| WO | WO2006077259 | 7/2006 | |
| WO | WO 2006105884 A1 * | 10/2006 | |
| WO | WO2008012314 | 1/2008 | |

OTHER PUBLICATIONS

Written Opinion for International Application No. PCT/EP2009/050154 mailed on Apr. 23, 2009.

* cited by examiner

CAPSULE WITH INTEGRATED ANTIMICROBIAL FILTER

Infant formulas have been developed as a substitute for human breast milk in order to provide required nutrients to infants. In general the infant formulas are either based on cow or soy milk and may be provided in different forms such as powder or concentrated liquid form.

Each of the different forms in which infant formulas may be provided has their own advantages. For instance, although the infant formula provided in a powder form has a relative high nutritional quality, the preparation thereof is time consuming, since the water used for reconstitution must be boiled in advanced and allowed to cool then poured into a sterilised drinking vessel containing the powder in order to prepare a ready to feed liquid infant formula.

If prepared and consumed in this manner, powdered infant formulas provide a safe and nutritionally good substitute for mother's milk in the situations described above. However, the process needs to be repeated every time a feed is required. It may readily be seen that this may not always be convenient and, as a consequence, many parents and other caregivers do not prepare the formulas properly and hence expose the infant to the risk of infection. For example, the water may not be boiled prior to use in which case any pathogens in the water are fed to the infant.

Usually water sources in developed countries are reasonably safe but this may not be the case everywhere. Alternatively, batches of the infant formula may be prepared and then stored until needed. Unfortunately, if any pathogen has contaminated the formula, it then has time to replicate.

In further development, infant formulas in ready-to-feed single serve portions have been introduced which overcome the inconvenience of the preparation of the infant formula. However, these ready-to-feed products are more costly than infant formulas stored in bulk and there is the same need to consume the formula immediately after opening to avoid the risk of contamination with bacteria.

The immune defences of infants and young children are generally not fully developed and, as a result, these populations are particularly vulnerable to both bacterial and viral infections. For example, they may be prone to infections in circumstances where the immune system of a healthy adult would resist infection or they may suffer more serious consequences as a result of infection than would a healthy adult. Similar difficulties may arise in populations where the immune system is compromised such as the elderly. The consequence of this is that devices that prepare nutritional compositions which are perfectly safe for healthy adults may not be able to produce products which meet the increased safety standards required for products to be consumed by subjects having immature or compromised immune systems.

Therefore, there is a need for a method or an apparatus which enables provision of nutritional composition, for instance, an infant formula in a convenient and safe manner.

WO2006/077259 discloses a method for preparing a single serving of a nutritional composition comprising introducing liquid such as water into a cartridge containing a unit dose of the composition in concentrated form. Thereby, the water is treated prior to the introduction into the cartridge in order to remove pathogens from the water. This treatment may be for instance a pre-heating, a filtering or an irradiation of the water with ultra-violet light.

A device which teaches the principle of treating water by means of a filter used for the preparation of nutritional compositions in a dispenser from capsules is disclosed in co-pending European patent application No. 06117801.8 filed 25 Jul. 2006 entitled "Dispenser for preparing a nutritional composition".

Further, although every care is taken to minimize contamination of powdered infant formulae by undesired bacteria, it is difficult to ensure the injection of sterile liquid, e.g., boiled water, in the capsule in an easy and practical way. For instance, liquid can be sterilized by a heating operation in the device but this requires a cooling stage to a controlled temperature, e.g., around 35 degrees, for serving to the baby. Thereby the preparation time is extended significantly or the liquid must be sterilized in advance. Therefore this adds a level of complexity and additional controls to the device. The use of UV light in the device also adds complexity, controls and requires regular maintenance.

Furthermore, certain nutritional formula might provide substrates for bacterial growth. Therefore, prolonged periods of storage, particularly at elevated temperatures might increase the amount of bacteria present.

Generally it is also known to use filter in a capsule containing coffee ingredients for filtering a liquid coffee extract and maintaining coffee solids in the capsule. E.g. EP0507905B1 relates to an apparatus and capsule for preparing a liquid product. An internal filtering membrane is placed in the bottom of the cartridge for retaining the solid particles in the cartridge and for preventing clogging of the flow channels provided in the perforating members.

Systems and methods for obtaining fluid comestibles from substances containing isolated capsules are for example known from EP-A-512470 (counterpart of U.S. Pat. No. 5,402,707).

However, such filters in capsules for ground coffee particles usually have a pore sizes of more than 10 μm, which pore size is adapted to the typical dimensions of coffee grounds and which (large) pore sizes are thought to be necessary in order to guarantee a sufficient flow rate of the beverage. Thus, these filters are not able to withhold microorganisms which typically have dimensions in the order of several μm (bacteria) or even much less (viruses).

U.S. Pat. No. 5,681,468 relates to a liquid dispenser for dispensing sterile liquids comprising a container for storing the sterile liquid, a nozzle assembly mounted on the container and a filter which has at least one surface and a plurality of its pore coated with metallic material, e.g., a metal or metal oxide or metal salt, that is bacteriostatic or bactericidal. However, such device is a multidose device and is designed for repeated usages. The coating reduces microbial growth and "growth-through" on the filter. Furthermore, bactericidal materials of metallic origin are undesirable as they can be delivered in the final beverage in uncontrolled quantities. Furthermore, the liquid is passed through the device at relatively low pressure by manual squeezing of the container.

It is therefore the object of the present invention to propose a technique for improving the microbiological safety of nutritional liquids produced from ingredients contained in a single-use capsule, i.e. by feeding a liquid into the capsule.

This is a particularly important aspect in case the liquid introduced in the capsule for mixing with the ingredients and/or the nutritional ingredients, such as e.g. infant formula ingredients, in the capsule are not perfectly sterile.

This object is achieved by means of the features of the independent claims. The depending claims develop further the central idea of the present invention.

A first aspect of the invention relates to a capsule for single use in a beverage production device. The capsule contains one or several ingredients for producing a beverage or liquid comestible when a liquid is fed into the capsule. The capsule is provided with an antimicrobial filter placed across the flow path of the liquid traversing the capsule. The antimicrobial filter is further placed between the inlet face and the outlet face of the capsule and, preferably, at a certain inward distance from the inlet face. As a result, it is ensured that the liquid introduced in the capsule is inevitably passed through the filter whether or not mixed with the ingredients contained in the capsule. The distance from the inlet filter also ensures that the risk of damaging accidentally or voluntarily the filter such as by opening of the face of the capsule (while still being able to use the capsule in the device) is considerably reduced. Furthermore, the filter is also placed inwardly distant from the outlet face.

In a mode, the antimicrobial filter is placed between an outlet face of the capsule and ingredients prone to bacterial contamination.

In another mode, the antimicrobial filter is placed in the capsule between the inlet face and the ingredients.

The filter can present a nominal pore size of 1 µm or less, more preferred 0.5 µm or less, most preferred 0.2 µm.

The ingredients prone to bacterial contamination may comprise milk powder and/or other infant formula components.

The antimicrobial filter may be arranged in an outlet opening of the capsule.

The antimicrobial filter can comprise a porous polymer membrane. The material for the membrane can be chosen from the list of: PES (polyethersulphone), cellulose acetate, cellulose nitrate, polyamide and combinations thereof.

Additionally or alternatively the antimicrobial filter comprises a paper layer.

Ingredients can be arranged between the antimicrobial filter and the outlet face of the capsule.

Alternatively, the antimicrobial filter can be arranged between the inlet face and the ingredients.

The antimicrobial filter can be fixed to the sidewall of the capsule.

The antimicrobial filter can be supported by at least one backing wall that may be placed adjacent the filter. The backing wall is more rigid than the filter. The backing wall ensures that the filter does not break, perforates or damaged otherwise under the effect of the liquid under the elevated pressure in the capsule (e.g., possibly between 2-10 bar) and/or by the jet created by the liquid stream(s) entering the capsule under high velocity. At least one backing member is placed adjacent and downstream of the filter. A second backing member can be placed upstream and adjacent the filter.

The antimicrobial filter is free of bacteriostatic or bactericidal material.

The rim of the antimicrobial filter may be sealed against the wall of the capsule.

When the antimicrobial filter is placed between the bottom of the capsule and the ingredients, the antimicrobial filter can be distanced from the bottom of the capsule. Alternatively, the antimicrobial filter can be at least partially in contact with the bottom of the capsule. The antimicrobial filter can also be at least partially sealed to the bottom of the capsule.

The antimicrobial filter may be externally attached to the capsule such as to the bottom of the capsule or at the top of the capsule.

The antimicrobial filter, when seen from the inlet face of the capsule, may completely extend over the entire interior of the capsule.

The antimicrobial filter may extend, when seen from the inlet face of the capsule, only partially over the entire interior of the capsule.

In a possible mode, the antimicrobial filter may also be arranged in an outlet opening of the capsule.

When the antimicrobial filter is placed between the top of the capsule and the ingredients, the antimicrobial filter can be distanced from the top of the capsule. In particular, a certain distance, such as 0.5-1.5 cm, enables to provide a sufficient gap for inserting in the capsule injection means such as needles, blades and the like, without risk of damaging the filter.

The filter can be formed of at least one porous polymeric thin membrane.

The antimicrobial filter may have a thickness of less than 500 µm, preferably less than 300 µm.

Another aspect of the invention relates to a beverage production system, comprising a capsule according to any of the preceding claims, and a beverage production machine.

The machine can be provided with
 chamber means for housing and supporting the capsule, and
 means for supplying a liquid to the capsule and optionally a gas (such as compressed air, nitrogen) to completely empty the capsule.

The beverage production machine may furthermore comprise:
 means for opening an inlet side of the capsule such as piercing means.

The beverage production machine can be designed such that the beverage produced in the capsule can be obtained from the capsule without the beverage contacting a part of the beverage production machine. For instance, the machine comprises a capsule holder comprising a lower opening of large enough section to entirely uncover the outlet of the capsule.

A still further aspect of the present invention relates to a method for reducing the microbial load in a nutritional liquid obtained by
 feeding a liquid into a ingredient containing capsule,
 letting interact the ingredients with the liquid wherein the obtained nutritional liquid is filtered by an antimicrobial filter which is part of the capsule and which is arranged inside or fixed outside to the capsule.

Further features, advantages and objects of the present invention will become evident when going through the following detailed description of preferred embodiments of the invention.

Figure 1:
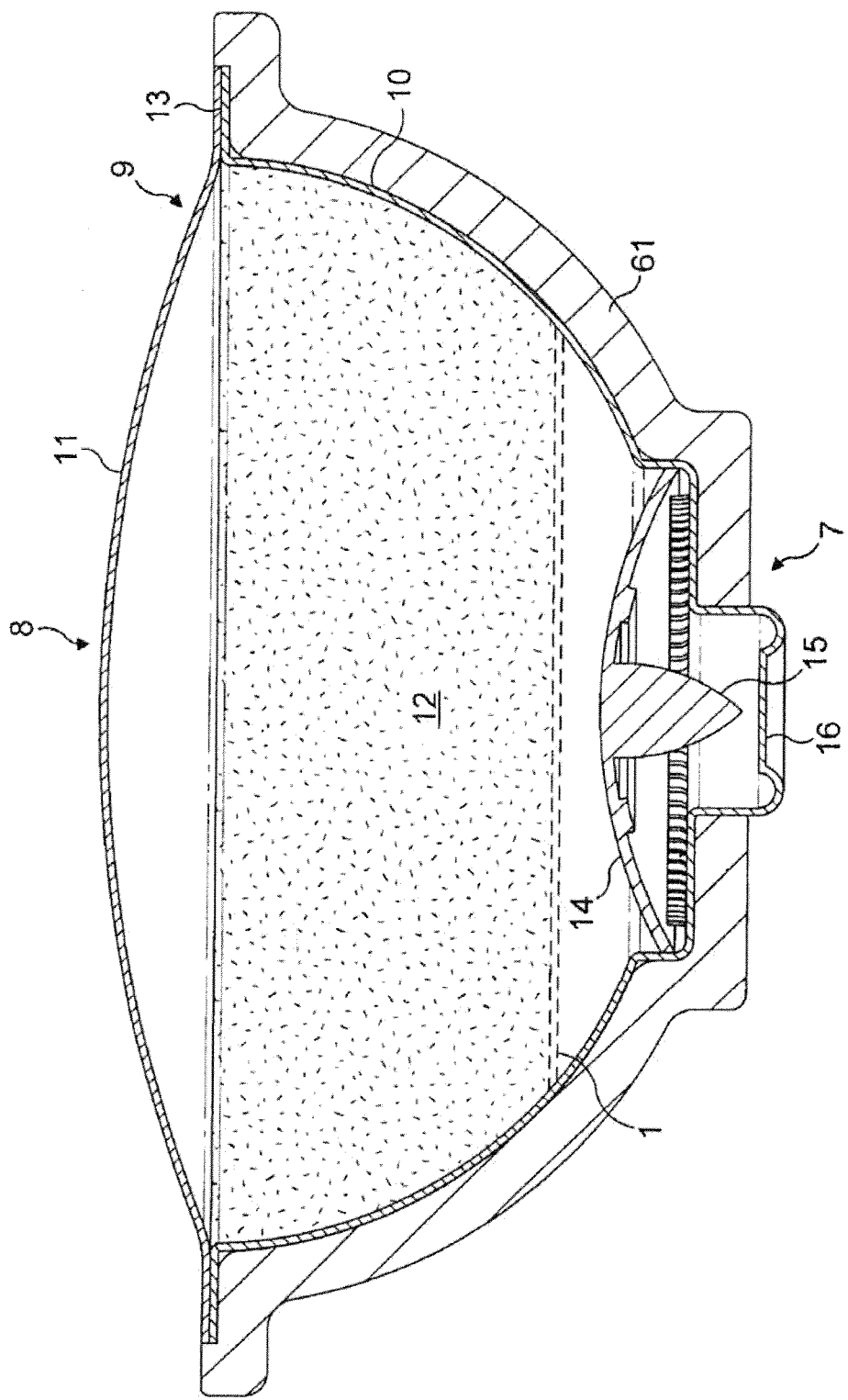
FIG. 1 shows an example of a capsule according to the present invention.

Generally the present invention proposes to integrate an antimicrobial filter into an ingredient containing capsule.

The term "antimicrobial filter" designates a filter which, through a mechanical filtering action reduces the number of microorganisms, such as e.g. bacteria, at the downstream side of the filter.

The invention generally relates to capsules which contain beverage or food ingredients and is particularly adapted for capsules containing infant formula ingredients such as e.g. milk-based powder. Preferably such capsules according to the present invention are sealed at a production site after having preferably been flushed by a protective gas such as nitrogen, and are opened once they have been placed in an associate beverage or liquid comestible production machine. Preferably the opening of the capsules is not done manually, but by a part of the associated beverage production machine and/or an internal mechanism of the capsule. This opening technique reduces the risks of a contamination of the interior of the capsule.

The capsule will be supplied manually or in an automated fashion to a chamber of the beverage production machine. The capsule is held in a defined position in the chamber. The liquid supply to the interior of the capsule and the draining of the nutritional liquid from the capsule is usually carried out while the capsule remains fixed in the chamber.

The production of the nutritional liquid can be based on a wide range of liquid/ingredient interaction principles, such as e.g. dissolution, dilution, brewing, extraction, mixing, suspending etc. Dissolution, dilution and suspending are preferred in case of infant formulas being present as powder, flaked or liquid concentrate ingredients inside the capsule.

Preferably the capsules will be opened at an inlet face thereof by associated opening or perforation means of the machine. On the other hand, at the outlet face of the capsules an opening or perforation can be produced either by integrated opening/perforation means of the capsule or by associated opening/perforation means being part of the beverage production machine.

A particular opening mechanism can be to thrust a face of the capsule to be opened against integrated or external perforation/opening means by a pressure built up in the interior of the capsule. This pressure built up can be caused by injecting a liquid, such as water through the inlet face of the capsule into the capsule.

Another mode could also be to have the capsule be opened via a septum or valve which opens as a result of the pressure build up in the capsule or by use of a pusher inserted in the capsule for opening the flow path through the septum or valve.

Preferably the integrated perforation/opening mechanism is used, which will be explained via the embodiment of FIG. 1. This internal mechanism is particularly used for so-called "direct flow" capsules, in which the produced liquid can be obtained (i.e., delivered) from the capsule without the produced liquid being contacting parts of the beverage production machine. This obviously reduces the risk of contamination of the beverage after it has been produced in the capsule via an interaction between the injected liquid and the ingredients contained in the capsule.

A closed capsule with integrated opening means is generally known e.g. from EP 1472156 B1 and will now be shortly explained with reference to FIG. 1 of the enclosed drawings.

FIG. 1 shows a capsule 9 comprising a cup shaped base body 10, which is form stable and e.g. made from plastics, and the membrane 11 welded at the peripheral welding edge 13 forming the periphery of said cup shaped base body 10. The membrane 11 can be made e.g. from a sandwich or metallic foil. The reference numeral 12 generally designates the ingredients. The system for opening the capsule according to this embodiment consists of a disc 14 arranged in the bottom of the cup shaped base body 10 and comprises a puncturing member 15. The puncturing member 15 is enclosed in the chamber formed by the cup shaped base body 10 and the membrane 11. The disc is thus arranged at the bottom of the cup in thus forms a wider area over which the internal pressure may be spread during extraction. At the time of extraction, the capsule is introduced into the beverage production machine, water is introduced via a needle which perforates the membrane 11, and under the effect of the rise and pressure in the capsule 9, the disc experiences a downward thrusting force towards the retaining part 16, such that the piercing member 15 opens the retaining part 16 of the cup shaped base body 10, thus allowing the beverage produced inside the capsule 9 to be drained.

The reference numeral 1 in FIG. 1 designates a antimicrobial or antimicrobial filter according to the present invention.

As can be seen in FIG. 1, this filter is arranged between at least a part of the ingredients 12 and the outlet opening 16 of the capsule 9.

Preferably the antimicrobial filter can present a nominal pore size of 1 µm or less, more preferred 0.5 µm or less, such as for example 0.2 µm.

Preferably the filter 1 comprises at least one filtering porous membrane which is sometimes also called "microporous filter". E.g. the filter can be made from thin layers of polymer and can have a thickness of less than 500 µm, preferably 10 to 300 µm.

Preferably the antimicrobial filter 1 has a high porosity (e.g. up to 70-90% of the total filter) in order to not unduly hinder the flow of the liquid across the filter 1.

Additionally the filter may be provided (e.g. coated) with a food grade antimicrobial agent (e.g. essential oils) killing microbes when the beverage passes through the filter 1.

The antimicrobial filter 1 can preferably be used together with a capsule containing milk powder and/or other infant formula components.

Figure 2:
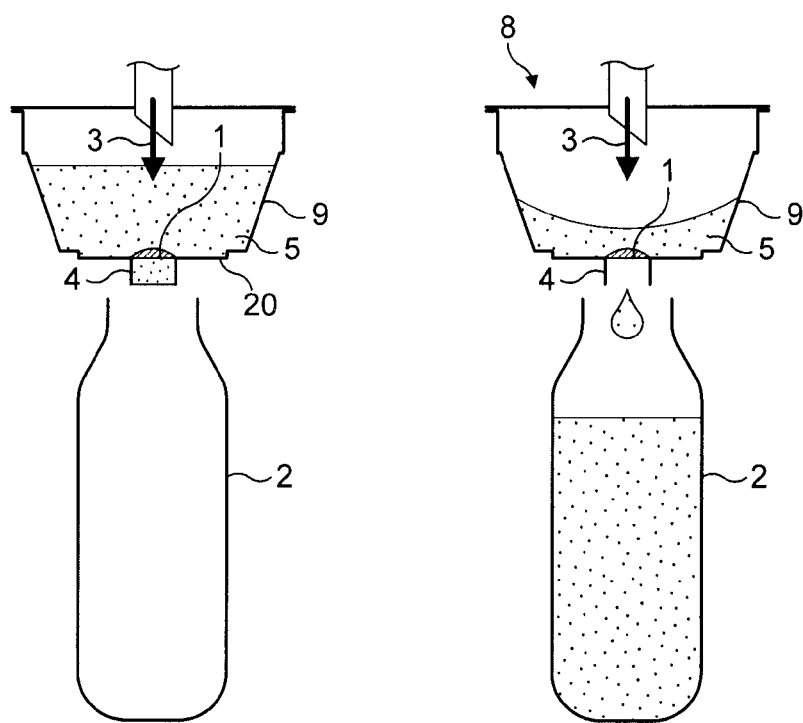
FIG. 2 shows schematically a capsule having an antimicrobial filter in an outlet opening of the capsule.
Figure 3:
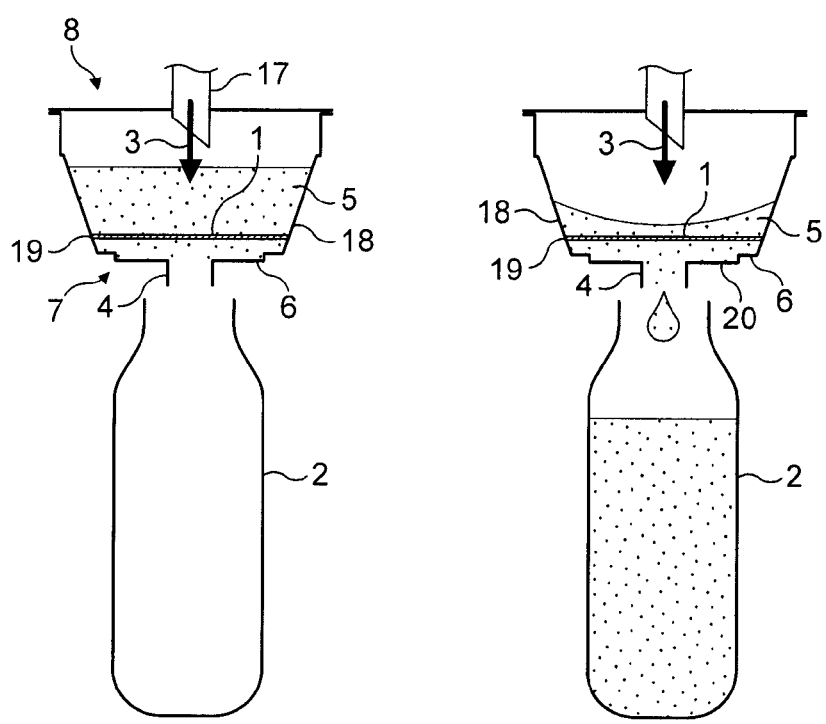
FIG. 3 shows schematically a capsule having an antimicrobial filter in the main enclosure of the capsule.

With reference to FIGS. 2 and 3 now further embodiments of the invention will be explained. The arrow referenced with the numeral 3 designates the incoming stream of a liquid, such as for example water on the inlet side (top side) of the capsule 9. Reference 17 designates means for perforating the inlet face of the capsule and supplying a liquid, which can be e.g. a pressurized hot liquid, preferably water.

In the embodiment of FIG. 2 the antimicrobial filter 1 is arranged in an outlet spout 4 of the capsule 9. In this case there can be only one main compartment 5 in the capsule at least partially filled with beverage ingredients.

The pressure of the injected liquid 3 is sufficient in order to thrust the beverage produced by the interaction of the liquid 3 with the ingredients in the compartment 5 through the filter 1. Any remaining liquid in the capsule can easily be discharged by a push of compressed air into the capsule, in order to ensure a nutritionally complete beverage.

As shown in FIGS. 2 and 3, the produced liquid can then directly flow (e.g. drop) into a baby bottle 2 placed under the outlet face of the capsule 9.

In the embodiment of FIG. 3 the antimicrobial filter 1 is arranged such that between the outlet spout 4 of the capsule 9 and the main compartment 5 for ingredients a second compartment 6 is present. If necessary, this second compartment 6 can also be at least partially filled with ingredients and especially with ingredients which are not or less prone to bacterial contamination in comparison to the ingredients in the compartment 5.

The antimicrobial filter 1 in the embodiment of FIG. 3 completely traverses the interior of the capsule 9, while the antimicrobial filter 1 in the embodiment of FIG. 2 extends only partially over the cross-sectional surface (when seen from above) of the interior of the capsule 9.

In the embodiment of FIG. 3 the antimicrobial filter is distanced from the bottom 20 of the capsule 9. In that case, it is preferably to have a backing wall to support with the filter membrane and prevent it from tearing under the pressure of liquid in the capsule. A backing wall may be a grid of plastic or metal for instance placed below the filter membrane. It is to be noted that the antimicrobial filter 1 can also be placed on the bottom 20 of the capsule 9 and can cover completely or partially the bottom 20. The antimicrobial filter 1 can be sealed to the bottom 20 over its entire surface or only partially, such as e.g. at its rim portion.

Note that the antimicrobial filter 1 can also be attached to the outside of the capsule 9 and preferably to the outer face of the bottom of the capsule 20.

The antimicrobial filter 1 is fixed (e.g. sealed at 19) to the inner surface of the sidewalls 18 of the capsule 9. The sealing 19 can be done e.g. via ultrasonic welding, gluing, press-fitting etc. The sealing guarantees that no beverage can flow between a potential gap between the filter 1 and the inner surface of the walls of the capsule 9 thus creating a bypass for non-filtered liquid.

As it becomes clear from FIG. 3, any ingredient housed in the second compartment 6, i.e. downstream of the filter 1, will not be filtered and will then reach the receptacle (bottle) 2 without filtering.

Recently, certain strains of bacteria have attracted considerable attention because they have been found to exhibit valuable properties for man if ingested. In particular, specific strains of the genera *Lactobacilli* and *Bifidobacteria* have been found to be able to colonise the intestinal mucosa, to reduce the capability of pathogenic bacteria to adhere to the intestinal epithelium, to have immunomodulatory effects and to assist in the maintenance of well-being. Such bacteria are sometimes called probiotics.

It has been proposed to add probiotics to infant formulae to encourage gut colonization to take place and to promote colonization with the "good" bacteria—species of *Bifidobacteria* and *Lactobacilli*—rather than the harmful bacteria—pathogens such as *clostridia*, etc. Typically a minimum of 10e7 cfu/g of formula is added although generally larger amounts are preferred, for example up to 10e12 cfu/g of formula. However, as probiotics are bacteria or other microorganisms, it will be appreciated that a microbial filter of the type proposed in the present invention will retain them equally as efficiently as pathogenic micro-organisms. Therefore, if it is desired that the infant formula in the capsule of the present invention should contain probiotics, special provision will have to be made to ensure that the probiotics are delivered into the bottle with the reconstituted formula. For example, probiotics microorganisms may be provided in the second compartment 6. The filter 1 will thus not withhold the probiotics in the main compartment 5.

Figure 4:
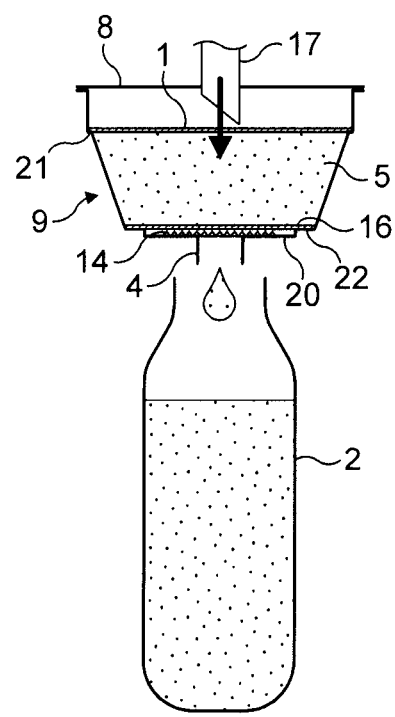
FIG. 4 shows schematically a capsule having an antimicrobial filter in the main enclosure of the capsule between the inlet face and the ingredients.

FIG. 4 illustrates another embodiment in which the antimicrobial filter is positioned between the inlet face 8 and the ingredients housed in compartment 5. Such ingredients may comprise an infant formula in powder or liquid concentrate form. The formula may include probiotics in dried form, eventually, encapsulated for being physically protected against the other ingredients. The filter is distanced from the inlet face 8 of a certain gap sufficient to enable the introduction of an injection means 17 such as a liquid injection needle. The filter can for instance be fixed, e.g., sealed, to a stepped portion 21 of the capsule. In the bottom of the capsule can be provided a tearable of puncturable membrane 16 and opening means such as a puncture plate or disc 14 placed between the bottom 20 or outlet 4 of the capsule and the membrane 16. The membrane can be sealed onto a second lower stepped portion 22 of the capsule. Of course the puncture plate could be made integral to the bottom of the capsule. In this embodiment, the filter 1 can be further supported by a backing member (not shown) placed between the ingredient and the filter. The inlet face 8 can be made of a flexible perforable material such as aluminium and/or plastics.

The invention claimed is:

1. A capsule for use in a beverage production device, the capsule containing ingredients for producing a nutritional liquid when a liquid is fed into the capsule at an inlet face thereof, the capsule comprising:
    an inlet face and an outlet face;
    an antimicrobial filter comprising at least one microporous polymer membrane free of bacteriostatic or bactericidal material and is supported by a backing member;
    a main compartment containing at least a portion of ingredients for producing a nutritional liquid, the portion of the ingredients in the main compartment comprising milk-based powder, and the antimicrobial filter being positioned between the outlet face and the portion of the ingredients in the main compartment and distanced from the outlet face; and
    a second compartment between the antimicrobial filter and the outlet face, the second compartment comprising probiotic microorganisms.

2. The capsule according to claim 1, wherein the antimicrobial filter has a nominal pore size of 1 μm or less.

3. The capsule according to claim 1, wherein the antimicrobial filter is fixed to a sidewall of the capsule.

4. The capsule according to claim 1 wherein the outlet face is a closed outlet face and the capsule further comprising an internal opening mechanism configured to open the outlet face of the capsule when pressure builds up inside the capsule by injecting a liquid into the inlet face of the capsule.

5. The capsule according to claim 1, wherein the antimicrobial filter has a thickness of less than 500 μm.

6. A method for reducing the microbial load in a nutritional liquid, the method comprising:
    feeding a liquid into an ingredient containing capsule at an inlet face thereof, the capsule comprising (i) an antimicrobial filter comprising at least one microporous polymer membrane free of bacteriostatic or bactericidal material and is supported by a backing member, (ii) a main compartment containing at least a portion of ingredients for producing a nutritional liquid, the portion of the ingredients in the main compartment comprising milk-based powder, and the antimicrobial filter being positioned between an outlet face of the capsule and the portion of the ingredients in the main compartment, and inwardly distanced from the outlet face, and (iii) a second compartment between the antimicrobial filter and the outlet face, the second compartment comprising probiotic microorganisms;
    allowing interaction of the ingredients in the main compartment with the liquid to form an unfiltered nutritional liquid;
    filtering the unfiltered nutritional liquid by passing the unfiltered nutritional liquid through the antimicrobial filter, thereby forming a filtered nutritional liquid;
    combining the filtered nutritional liquid with the probiotic microorganisms within the second compartment; and
    dispensing the filtered nutritional liquid comprising the probiotic microorganisms from the outlet face.

7. A capsule for producing a nutritional liquid when a liquid is fed into the capsule, the capsule comprising:
    an inlet face and an outlet face;
    an antimicrobial filter comprising at least one microporous polymer membrane free of bacteriostatic or bactericidal material and is supported by a backing member;
    a main compartment containing at least a portion of ingredients contained by the capsule, the portion of the ingredients in the main compartment comprising milk-based powder, and the antimicrobial filter being positioned between the outlet face of the capsule and the portion of the ingredients in the main compartment and inwardly distanced from the outlet face; and a second compartment located between of the antimicrobial filter and the outlet face, the second compartment comprising probiotic microorganisms.

8. The capsule according to claim 1, wherein the antimicrobial filter is fixed to a sidewall of the capsule at an inner diameter of the sidewall that is below where the inlet face is connected to the sidewall.

9. The capsule according to claim 1, wherein the inlet face, the antimicrobial filter and the bottom surface of the capsule are parallel to each other.

10. The capsule according to claim 7, wherein the antimicrobial filter is fixed to a sidewall of the capsule at an inner diameter of the sidewall that is below where the inlet face is connected to the sidewall.

11. The capsule according to claim 7, wherein the antimicrobial filter abuts the portion of the ingredients in the main compartment.

12. The capsule according to claim 7, wherein the inlet face, the antimicrobial filter and the bottom surface of the capsule are parallel to each other.

\* \* \* \* \*